US00RE44094E

(19) United States
(12) Reissued Patent
Kiko

(10) Patent Number: US RE44,094 E
(45) **Date of Reissued Patent: *Mar. 19, 2013**

(54) IMPEDANCE BLOCKING FILTER CIRCUIT

(75) Inventor: Frederick J. Kiko, Carlsbad, CA (US)

(73) Assignee: Pulse Electronics, Inc., San Diego, CA (US)

( * ) Notice: This patent is subject to a terminal disclaimer.

(21) Appl. No.: 12/710,193

(22) Filed: Feb. 22, 2010

Related U.S. Patent Documents

Reissue of:
(64) Patent No.: 6,188,750
Issued: Feb. 13, 2001
Appl. No.: 09/195,522
Filed: Nov. 19, 1998

U.S. Applications:
(63) Continuation of application No. 10/366,656, filed on Feb. 12, 2003, now Pat. No. Re. 41,145.

(51) Int. Cl.
*H04M 11/04* (2006.01)
*H04M 1/00* (2006.01)

(52) U.S. Cl. ..... 379/38; 379/398; 379/399.01; 379/413.01; 379/413.02; 379/90.01; 379/412; 379/394; 333/167; 333/177; 375/219; 375/220

(58) Field of Classification Search ..... 379/90.01, 379/93.01, 93.05, 166, 387.01, 390.01, 391, 379/394, 399.01, 413.02, 413.04, 412, 415; 333/17.3, 18, 165, 167, 172, 173, 175–177, 333/186, 24 C
See application file for complete search history.

(56) References Cited

U.S. PATENT DOCUMENTS 4,613,732 A 9/1986 Cwirzen et al.
4,667,173 A 5/1987 Okochi
4,742,541 A 5/1988 Cwirzen et al.
4,743,999 A 5/1988 Hames
4,761,623 A 8/1988 Schneider
4,823,383 A 4/1989 Cardot et al.
5,077,630 A 12/1991 Bina
5,623,543 A 4/1997 Cook
5,627,501 A * 5/1997 Biran et al. ..... 333/17.1
5,642,416 A 6/1997 Hill et al.
5,721,774 A * 2/1998 Stiefel ..... 379/413
5,802,170 A 9/1998 Smith et al.
5,848,150 A 12/1998 Bingel
5,930,340 A 7/1999 Bell
5,974,139 A 10/1999 McNamara et al.
6,137,866 A 10/2000 Staber et al.
6,141,377 A 10/2000 Sharper et al.
6,144,734 A 11/2000 Beeman
6,144,735 A 11/2000 Bella
6,317,464 B1 11/2001 Le et al.
6,418,221 B1 * 7/2002 Snow et al. ..... 379/399.01
(Continued)

*Primary Examiner* — Quoc D Tran
(74) *Attorney, Agent, or Firm* — Gazdzinski & Associates, PC

(57) ABSTRACT

An impedance blocking filter circuit is provided for use in telecommunication systems for interconnecting between incoming telephone lines and customer's terminal equipment so as to unconditionally block impedances above 20 KHz due to the customer's terminal equipment from an ADSL network unit and/or home networking interface unit. The filter circuit includes first, second, and third inductors connected in series between a first input terminal and a first common point. A first resistor has its one end connected also to the first common point and its other end connected to a first output terminal. Fourth, fifth and sixth inductors are connected in series between a second input terminal and a second common point. A second resistor has its one end also connected to the second common point and its other end connected to a second output terminal. A capacitor has its ends connected across the first and second common points. In another aspect, the filter circuit also includes current limiting protection circuitry for reducing ring trip, dial pulse and off-hook transient current spikes.

18 Claims, 3 Drawing Sheets

U.S. PATENT DOCUMENTS 6,477,249 B1 11/2002 Williamson et al.
6,552,630 B2 4/2003 Chueh et al.
6,628,783 B1 9/2003 Van Wonterghem
RE41,145 E * 2/2010 Kiko ..... 379/38

* cited by examiner

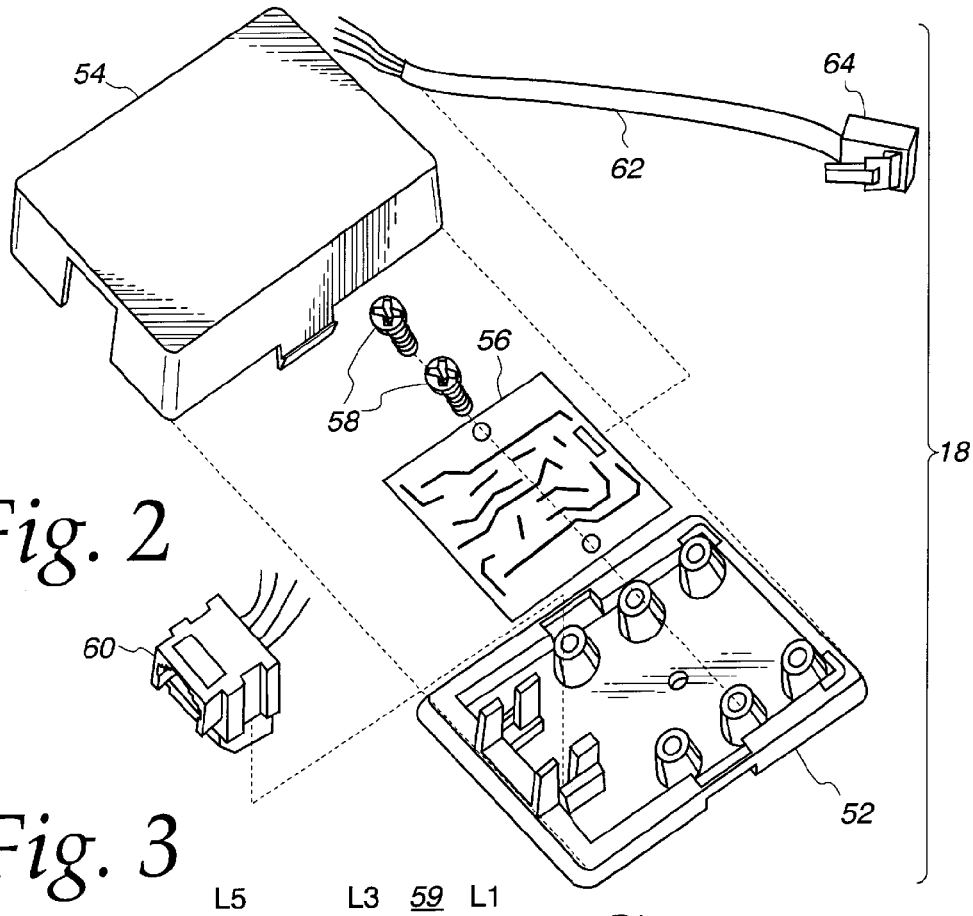
Fig. 2
Fig. 3
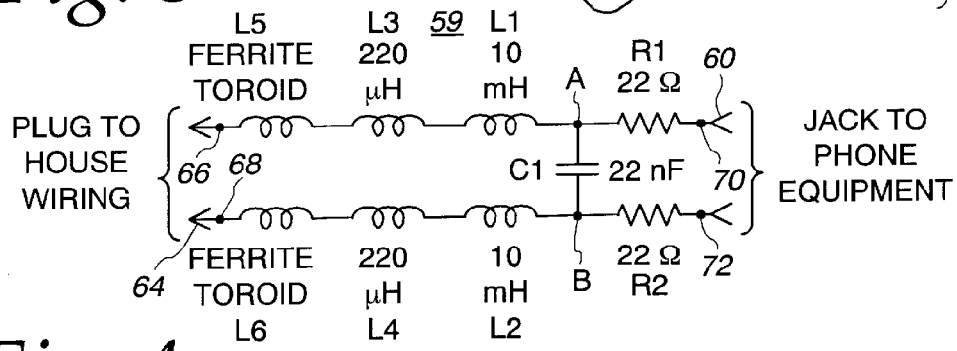
Fig. 4
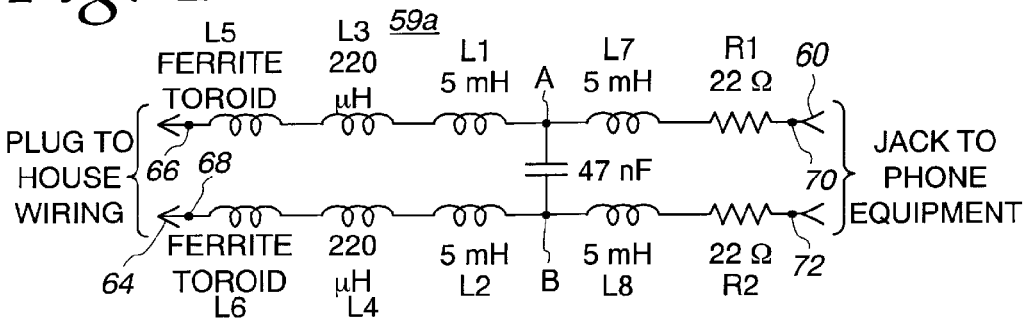

IMPEDANCE BLOCKING FILTER CIRCUIT

Matter enclosed in heavy brackets [ ] appears in the original patent but forms no part of this reissue specification; matter printed in italics indicates the additions made by reissue.

*PRIORITY AND RELATED APPLICATIONS*

*The present reissue application is a continuation application of prior application Ser. No. 10/366,656 filed Feb. 12, 2003 of the same title, now U.S. Pat. No. Re. 41,145, which is a reissue of application Ser. No. 09/195,522 filed Nov. 19, 1998, now U.S. Pat. No. 6,188,750 issued Feb. 13, 2001 of the same title, each of the foregoing incorporated by reference herein in its entirety.*

BACKGROUND OF THE INVENTION

1. Field of the Invention

This invention relates generally to telecommunication systems and more particularly, it relates to an impedance blocking filter circuit used in telecommunication systems for interconnecting between incoming telephone lines from a telephone company's central office (C.O.) and subscriber or customer telephone equipment such as a telephone set located at a subscriber's premises so as to unconditionally block telephone impedance above 20 KHz.

2. Description of the Prior Art

The prior art appears to be best exemplified in the following U.S. Letters Patent which were developed in a search directed to the subject matter in this application:

| | |
|---|---|
| 4,613,732 | 4,823,383 |
| 4,742,541 | 5,642,416 |
| 4,743,999 | 5,802,170 |

In U.S. Pat. No. 4,823,383 issued to Cardot et al. on Apr. 18, 1989, there is disclosed a protection device for terminal equipment on telephone subscriber premises which includes a voltage surge protection circuit and/or a filter for providing protection against radio frequencies and interference. The filter is comprised of series inductors L1, L2, L3 and L5 interconnected between terminals E1 and S1 and series inductors L'1, L'2, L4 and L'5 interconnected between terminals E2 and S2. A capacitor C5 is connected between the junctions of the inductors L2, L3 and the inductors L'2, L4. The surge protection circuit includes thermistors TH1, TH2 and voltage limiters D1-D3.

In U.S. Pat. No. 5,802,170 issued to Smith et al. on Sep. 1, 1998, there is disclosed a customer bridge module for connecting telephone company wiring and subscriber telephone wiring in a telephone network interface apparatus. In one embodiment, the customer bridge module includes overcurrent protection and an RFI filter. The overcurrent protection is formed by positive temperature coefficient resistors 220, 222 and inductors. The RFI filter is formed by inductors 224a-224c, 226a-226c and capacitors 236a-236c. The inductors and capacitors are used to form a multi-pole low pass filter.

In U.S. Pat. No. 5,642,416 issued to Hill et al. on Jun. 24, 1997, there is disclosed an electromagnetic interference bypass filter which suppresses RF noise currents conducted over the tip and ring leads of a telephone line-powered instrument. The filter includes first and second inductors 51, 53 and first and second capacitors 41, 43.

It is generally well-known these days that many telephone subscribers or customers also have a personal computer located on their premises. At times, the computer user receives ADSL (an acronym for Asymmetric Digital Subscriber Line) signals from the Internet over the same telephone lines via an Internet Server Provider (ISP). In order to increase the speed of downloading of information from the Internet, an ADSL network interface is typically purchased and installed between the incoming telephone lines and the user's computer. However, since one or more telephone subscriber terminal equipment such as telephone sets, facsimile machines and/or answering devices are also connected to the same incoming telephone lines via internal house wiring, ADSL interference problems may be caused by the terminal equipment which can significantly limit or reduce the data rate. In one situation, it has been experienced that the change of state from "on-hook" to "off-hook" of the telephone equipment and sometimes the telephone terminal equipment even being "on-hook" can create a resonance effect to occur so as to drop the impedance value to less than 10 Ω(Ohms) at a frequency as high as 500 KHz.

Accordingly, it would be desirable to provide an impedance blocking filter circuit for connection to the telephone terminal equipment causing the erratic input impedances. The impedance blocking filter circuit of the present invention is of a modular design so as to be easily connected in series with the offending telephone terminal equipment. The impedance blocking filter circuit blocks unconditionally any telephone impedances (e.g., open, short, capacitive, inductive, resonant, or any combination thereof) above the frequency of 20 KHz.

SUMMARY OF THE INVENTION

Accordingly, it is a general object of the present invention to provide an impedance blocking filter circuit which effectively and efficiently eliminates ADSL interference caused by telephone terminal equipment.

It is an object of the present invention to provide an impedance blocking filter circuit for connection to telephone terminal equipment causing the erratic input impedances.

It is another object of the present invention to provide an impedance blocking filter circuit used in telecommunication systems for interconnecting between incoming telephone line and customer's terminal equipment so as to unconditionally block impedance above 20 KHz due to the customer's terminal equipment from an ADSL network interface unit and/or home networking interface unit.

It is still another object of the present invention to provide an impedance blocking filter circuit which is of a modular design so as to be easily connected in series with the offending telephone terminal equipment.

It is still yet another object of the present invention to provide an impedance blocking filter circuit which is comprised of six inductors, two resistors, and a capacitor.

In accordance with a preferred embodiment of the present invention, there is provided an impedance blocking filter circuit used in telecommunication systems for interconnecting between incoming telephone lines and customer's terminal equipment so as to unconditionally block impedances above 20 KHz due to the customer's terminal equipment from an ADSL network interface unit and/or home networking interface unit. The filter circuit includes first, second and third inductors connected in series between a first input terminal and a first common point. The first inductor has its one end connected to the first input terminal and its other end connected to one end of the second inductor. The second inductor has its other end connected to one end of the third inductor.

The third inductor has its other end connected to the first common point. A first resistor has its one end also connected to the first common point and its other end connected to a first output terminal.

The filter circuit further includes fourth, fifth and sixth inductors connected in series between a second input terminal and a second common point. The fourth inductor has its one end connected to the second input terminal and its other end connected to one end of the fifth inductor. The fifth inductor has its other end connected to one end of the sixth inductor. The sixth inductor has its other end connected to the second common point. A second resistor has its one end also connected to the second common point and its other end connected to a second output terminal. A capacitor has its one end connected to the first common point and its other end connected to the second common point.

BRIEF DESCRIPTION OF THE DRAWINGS

These and other objects and advantages of the present invention will become more fully apparent from the following detailed description when read in conjunction with the accompanying drawings with like reference numerals indicating corresponding parts throughout, wherein:

FIG. 2 is an exploded, perspective view of one form of a module housing the impedance blocking filter circuit;

FIG. 3 is a schematic circuit diagram of an impedance blocking filter circuit, constructed in accordance with the principles of the present invention;

FIG. 4 is a schematic circuit diagram of a second embodiment of an impedance blocking filter circuit, in accordance with the principles of the present invention;

DESCRIPTION OF THE PREFERRED EMBODIMENT

Figure 1:
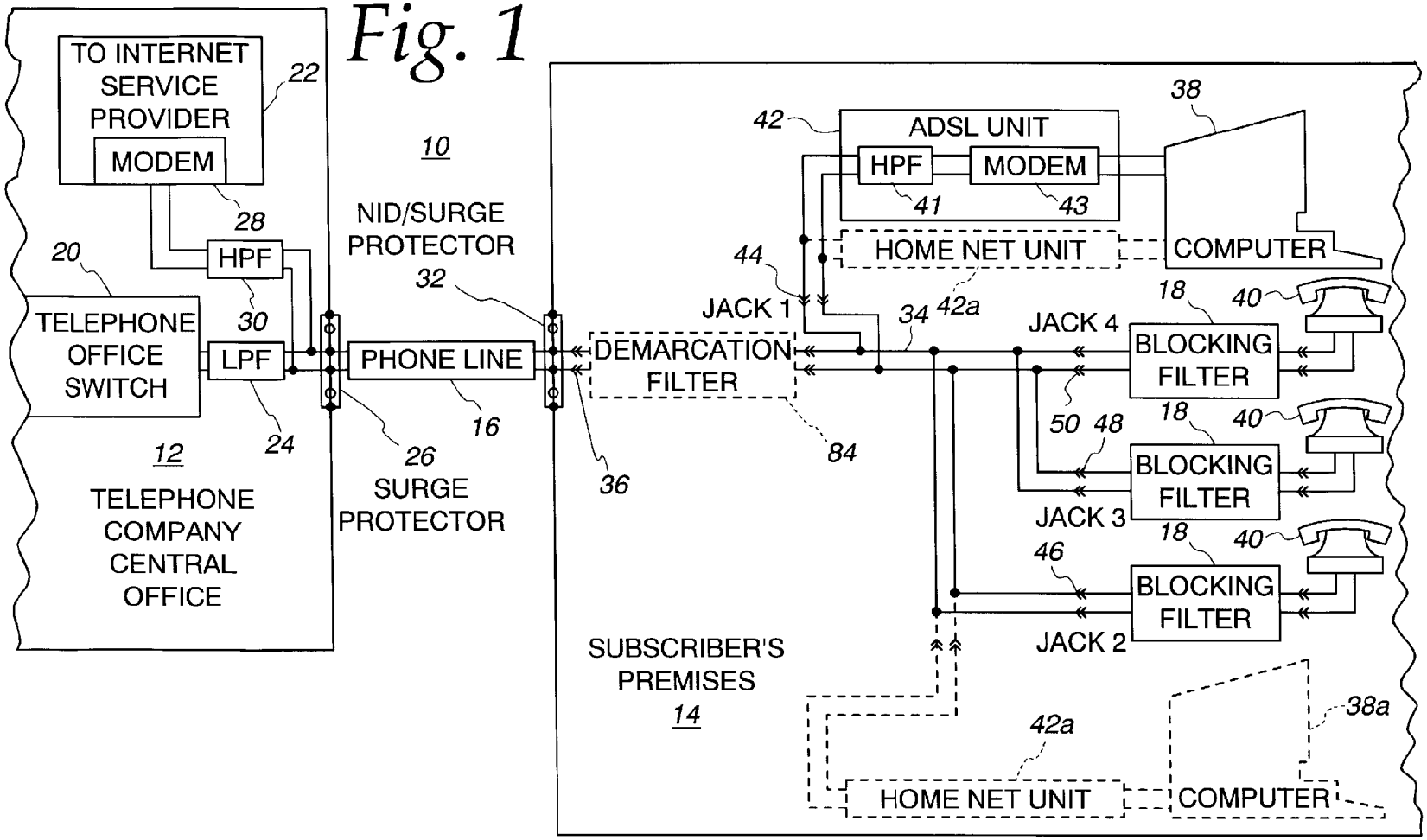
FIG. 1 is an overall block diagram of a telecommunication system for interconnecting a central office and a subscriber's premises, employing an impedance blocking filter circuit of the present invention.

Referring now in detail to the drawings, there is illustrated in FIG. 1 an overall block diagram of a telecommunication system 10 for interconnecting a telephone company's central office (CO) 12 and a subscriber's premises 14 over a transmission media such as a conventional twisted pair of telephone lines 16. The telecommunication system 10 employs a plurality of impedance blocking filter circuits, constructed in accordance with the principles of the present invention, in which each is contained in a modular housing 18.

The central office 12 includes a telephone office switch 20 and an Internet Service Provider (ISP) 22. The telephone office switch 20 is used to send voice signals via a low-pass filter 24 and a surge protector 26 to the telephone line 16. The ISP 22 transmits ADSL data signals to a modem 28 which are then sent to the telephone lines 16 via a high-pass filter 30 and the surge protector 26. It should be understood that the voice signals from the telephone office switch 20 and the ADSL data signals from the ISP 22 can be transmitted simultaneously to the telephone lines 16. Further, the voice signals (speech) are in the frequency band between 300 and 3400 Hz, and the ADSL data signals are in the frequency band between 30 KHz and 2 MHz The subscriber's premises 14 includes a Network Interface Device (NID)/surge protector unit 32 which is connected to the incoming telephone lines 16 on its input side and is connected to the subscriber's internal wiring or house wiring 34 on its output side via a demarcation RJ-11 jack and plug unit 36. As can be seen, the subscriber's premises further includes a number of terminal equipment such as a plurality of telephone sets 40. At times, the computer user will be downloading information to a personal computer 38 from the Internet by receiving ADSL data signals transmitted by the ISP 22.

In order to optimize the downloading of this information from the Internet, the user can purchase and install an ADSL network interface unit 42 for connection between the computer 38 and a RJ-11 jack and plug unit 44. The ADSL network interface unit 42 includes a high-pass filter 41 connected to the RJ-11 unit 44 and an internal modem 43 connected to the computer 38. The RJ-11 unit 44 is connected to the house wiring 34 for receiving the ADSL signals from the telephone lines 16. However, it will be observed that the plurality of telephone sets 40 are also connected to the same house wiring 40 via RJ-11 units 46, 48 and 50, respectively.

If it were not for the impedance blocking filter circuits 18 in the present invention, the output impedance from each of the telephone sets 40 would be connected in parallel with the input impedance of the ADSL unit 42. Since the output impedances from the telephone sets are subject to wide variations due to, for example, changing from "on-hook" to "off-hook" so as to present either an open, a short, capacitive, inductive, resonant, or any combination thereof at frequencies above 20 KHz, this erratic impedance can significantly affect the rate of the ADSL data signals being received by the computer 38 via the ADSL network interface unit 42.

Therefore, the main purpose of the impedance blocking filter circuit of the present invention is to isolate the terminal equipment (telephone sets) impedances from the ADSL unit 42 and the house wiring 34 so as to eliminate degradation of the performance of the ADSL unit 42. Further, the impedance blocking filter circuit serves to attenuate the ADSL data signal from being received by the telephone sets 40 in order to prevent nonlinear conversion to voice band signals. Moreover, to facilitate the installation required by the customer, the filter circuit is contained in the modular housing 18.

As can best be seen from FIG. 2, one form of the modular housing 18 includes a base 52 and a snap-on removable cover 54. The base has a printed circuit board 56 which is fixedly secured thereto by screws 58 and has mounted thereon the electrical circuit components for the filter circuit 59. One end of the modular housing 18 has a RJ-11 jack 60 formed integrally therewith for connection to the telephone set. This connection is achieved by plugging a RJ-11 plug (not shown) from a telephone set into the jack 60. The other end of the modular housing 18 has a short length of cable 62 extending therefrom and terminating in a RJ-11 plug 64 which is connectable to the house wiring. In particular, the plug 64 is connected to the house wiring 34 by plugging the same into a wall socket (not shown) having a RJ-11 jack.

In FIG. 3, there is shown a detailed schematic circuit diagram of the impedance blocking filter circuit 59 of the present invention for connection in series between the house wiring 34 and the terminal equipment (telephone set) of FIG. 1. The filter circuit 59 includes two input (tip and ring) terminals 66, 68 which are connectable to the house wiring 34 via the RJ-11 plug 64 and two output (tip and ring) terminals 70, 72 which are connectable to the telephone set 40 via the RJ-11 jack 60.

The filter circuit 59 is comprised of inductors L1-L6, a capacitor C1, and resistors R1, R2.

The inductors L5, L3, L1 and the resistor R1 are connected in series between the first or tip input terminal 66 and the first or tip output terminal 70. Similarly, the inductors L6, L4, L2 and the resistor R2 are connected in series between the second or ring input terminal 68 and the second or ring output terminal 72. The inductors L5 and L6 are each preferably formed of a ferrite toroid. The inductors L3 and L4 have the same inductance values, and the inductors L1 and L2 have the same inductance values. The inductor L1 and the first resistor R1 are connected together at a common point A and to one side of the capacitor C1. The inductor L2 and the second resistor R2 are connected together at a common point B and to the other side of the capacitor C1. The resistors R1 and R2 also have the same values.

As previously pointed out, the primary purpose of the impedance blocking filter circuit 59 is to block the impedances from the telephone set at above the frequency of 30 KHz from reaching the house wiring 34, thereby preventing adverse performance of the ADSL network unit 42 (FIG. 1). In particular, the ADSL data signals being in the frequency range of 30 KHz and 2 MHz are mainly blocked by the inductors L1 and L2. However, it has been experienced that some telephone sets have an input capacitance of less than 5 nf which can cause resonant impedances to occur within the ADSL band. In order to eliminate this undesirable effect, the capacitor C1 is used to lower any resonance into an acceptable dead band at around the 10 KHz frequency. Further, the capacitor C1 also provides additional attenuation of the ADSL signals so as to prevent driving the telephone impedance into a non-linear region and converting the high frequency ADSL signals into audible signals which can be heard by the subscriber or converted to another ADSL band and cause ADSL interference. While there may still exist other minor resonances in the telephone set in the frequency range of between 20 KHz and 60 KHz, their undesirable effect is significantly reduced by the resistors R1 and R2 which produce a de-Q effect. It should be noted that the inductors L1 and L2 are formed as separate inductors so as to avoid longitudinal impedance problems as well as blocking differential impedances.

Since the inductors L1 and L2 have their own frequency limitations (e.g., self-resonant frequency), the inductors L3 and L4 are provided so as to block the telephone impedances in the frequency band of 1 MHz to 20 MHz. These inductors L3, L4 are necessary when phoneline home networking interface units (FIG. 1) are being used in conjunction with the ADSL network interface unit 42, as will be explained hereinafter. The inductors L5 and L6 are provided so as to block the telephone set impedances in the frequency band of 20 MHz to 500 MHz, which will prevent any problems caused by TV/FM interference.

For completeness in the disclosure of the above-described filter circuit but not for purposes of limitation, the following representative values and component identifications are submitted. These values and components were employed in a filter circuit that was constructed and tested, and which provides high quality performance.

| PART | TYPE or VALUE |
|---|---|
| L1, L2 | 10 mH |
| L3, L4 | 220 μH |
| L5, L6 | ferrite toroid, 75 μH |

-continued

| PART | TYPE or VALUE |
|---|---|
| C1 | 20 nf |
| R1, R2 | 22Ω |

Figure 5:
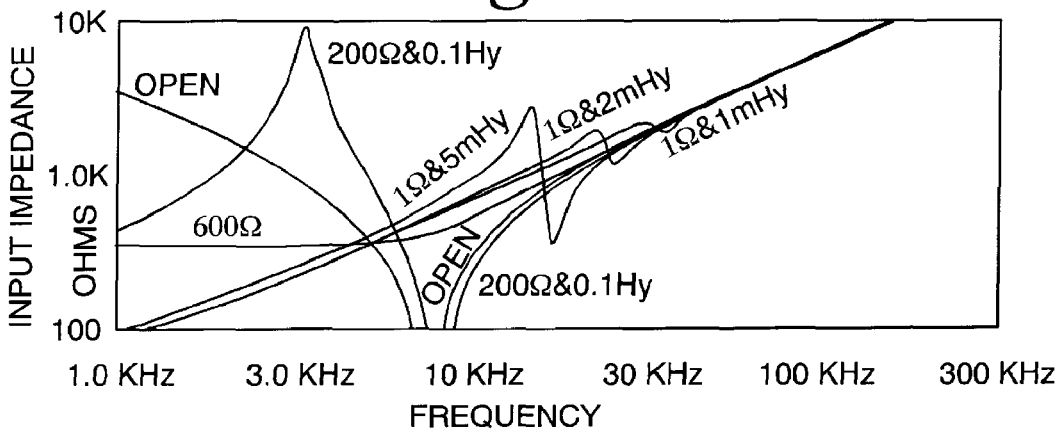
FIG. 5 is a plot of input impedances of the impedance blocking filter circuit of FIG. 3 for various telephone equipment impedances as a function of frequency.

With these above values being used, the input impedance of the impedance blocking filter circuit 59 was plotted for various telephone equipment impedances (e.g., open, short, capacitive, inductive, resonant, or a combination of these conditions) as a function of frequency and is illustrated in FIG. 5. As can be seen from the various curves, the input impedance across the input terminals 66, 68 of the impedance blocking filter circuit 59 for any telephone impedances connected across its output terminals 70, 72 is equal to or greater than 2K Ohms at frequencies above 40 KHz.

The impedance blocking filter circuit 59 of FIG. 3 is basically a second-order filter and has been found to minimize adequately voice band transmission effects when up to eight (8) filter circuits are installed into the telecommunication system of FIG. 1. In order to provide higher attenuation at frequencies above 20 KHz, there is shown in FIG. 4 a schematic circuit diagram of a second embodiment of a third-order impedance blocking filter circuit 59a of the present invention. The third-order filter circuit of FIG. 4 is substantially identical to the second-order filter circuit of FIG. 3, except there has been added an inductor L7 and an inductor L8. The inductor L7 is interconnected between the common point A and the first resistor R1, and the inductor L8 is connected between the common point B and the second resistor R2. The inductors L7 and L8 have the same inductance values.

Based upon tests conducted on the third-order filter circuit of FIG. 4, it was observed that higher attenuation was provided at frequencies above 20 KHz. However, it was found that the number of such third-order filter circuits which could be connected to the telecommunication system of FIG. 1 was limited to three or four. This is due to the fact that the inductor values of L1, L5, L7 and L8 of FIG. 4 are smaller (on the order of 5-10 mH) than the ones in FIG. 3, the capacitor value of C1 of FIG. 4 is larger (on the order of 33-47 nf) than the one in FIG. 3, and the additive capacitive loading caused by each added filter circuit will adversely affect the voice band performance. Thus, the optimized operation between voice performance and ADSL performance was found to exist when only three or four filter circuits 59a were installed.

While the filter circuit of FIG. 3 performed adequately, the inventor has found based upon further testing that a transient problem will occur when the telephone set goes "off-hook" at the peak of the ring signal. This "off-hook" transient condition may cause current spikes to occur which are higher than 600 mA. As a result, the high current will tend to saturate the inductors, thereby momentarily lowering the input impedance of the filter circuit and thus adversely affects the data on the ADSL signal being transmitted to the interface unit 42.

Figure 6:
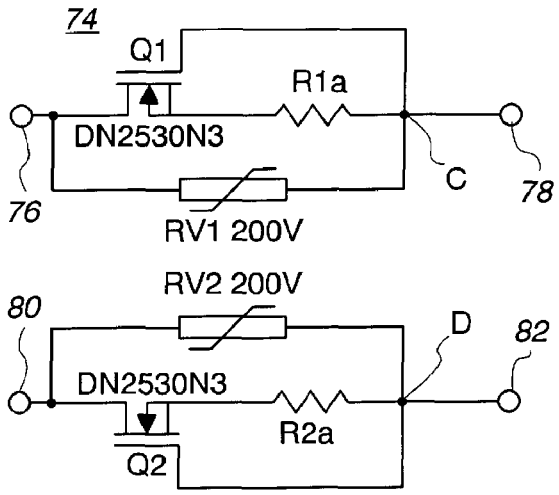
FIG. 6 is a schematic circuit diagram of current limiting protection circuitry for use with the filter circuit of FIG. 3.

In order to overcome this current transient problem, the inventors have developed fast current limiting protection circuitry 74 for providing protection against the "off-hook" transients. In FIG. 6 of the drawings, there is shown a schematic circuit diagram of the current limiting protection circuitry 74 which is comprised of depletion mode N-channel field-effect transistors (FET) Q1, Q2; resistors R1a, R2a; and varistors RV1, RV2. The FET Q1 has its drain electrode connected to a first input terminal 76, its source electrode connected to one end of the resistor R1a, and its gate electrode connected to the other end of the resistor R1a. The common point C of the gate electrode of the transistor Q1 and the resistor R1a is also joined to the first output terminal 78. Similarly, the FET Q2 has its drain connected to a second input terminal 80, its source connected to one end of the resistor R2a, and its gate electrode connected to the other end of the resistor R2a. The common point D of the gate of the transistor Q2 and the resistor R2a is also joined to a second output terminal 82. One end of the varistor RV1 is connected to the drain of the transistor Q1, and the other end thereof is connected to the common point C. One end of the varistor RV2 is connected to the drain of the transistor Q2, and the other end thereof is connected to the common point D.

In use, the current limiting protection circuitry 74 replaces the resistors R1 and R2 of FIG. 3. The first and second input terminals 76, 80 of the protection circuitry 74 are connectable to the common points A and B of FIG. 3, and the first and second output terminals 78, 82 thereof are connected to the tip and ring output terminals 70, 72 of FIG. 3. The transistors Q1, Q2 may be similar to the ones commercially available from Supertex Corporation under their Part No. DN2530N3. The varistors may be similar to the type ZNR which are manufactured and sold by Panasonic Corporation. The resistors R1a and R2a have the same resistance value and are on the order of 5-20 Ohms depending on the thresholds of the transistors Q1, Q2. It should be understood that the transistors Q1, Q2 have a large tolerance on current limit and the resistors R1a, R2a permit the desired current limit value to be adjusted. Alternatively, the resistors R1a, R2a may have a value of zero Ohms or be entirely eliminated.

In normal on-hook operation, the transistors Q1 and Q2 are rendered conductive and have an on-resistance value of about 10 Ohms. When the telephone set goes "off-hook" into high ringing voltage, the gate-to-source voltage of the forward conducting FET will become more negative due to the resistors R1a, R2a. As a result, the resistance of the transistors Q1, Q2 will go very high which will limit the current spikes to approximately 70-100 mA. The transistor Q1 serves to limit the current flowing in a first direction, and the transistor Q2 serves to limit the current flow in a reverse direction. Further, the varistors RV1, RV2 defining transient protection means function to clamp transients caused by lightning and power shorts from damaging or destroying the FETs Q1, Q2.

In view of continuing increased use of home computers and the high demand for accessing of information from the Internet in the last decade or so, many of the subscribers will be multi-PC homes. As shown in FIG. 1, the subscriber's premises or small business will typically have a second computer 38a also connected to the same internal house wiring 34. In order to effect high-speed data transfer in the multi-PC environment, there will be required phoneline home networking interface units 42a for using the internal house wiring in the frequency band above 5 MHz so as to interconnect the multiple computers 38, 38a or other devices at data rates above 10 MB/s as illustrated. While the impedance filter circuit of the present invention adequately filters and blocks the telephone impedances from the home networking signals, which are in the frequency band of 5-10 MHz, it will be noted that the home networking signals from the telephone company's C.O. are however still connected to the house wiring via the NID/surge protector unit 32.

Figure 7:
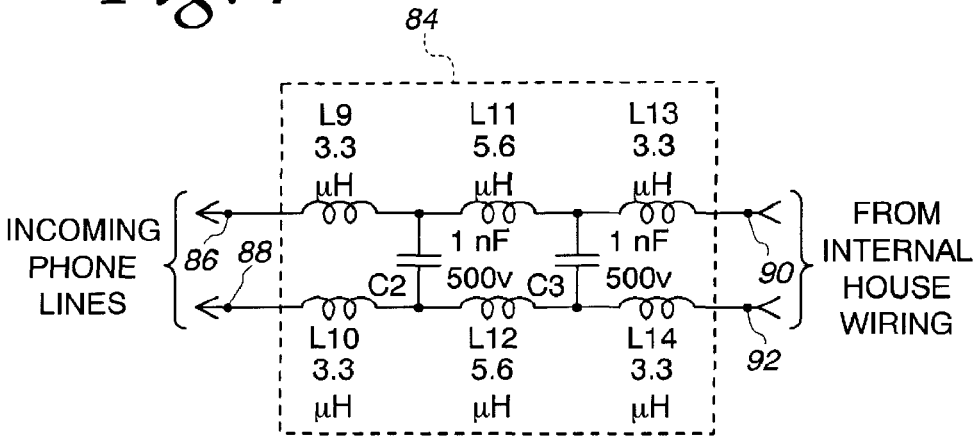
FIG. 7 is a schematic circuit diagram of a home network demarcation filter for use with the filter circuit of FIG. 3.

In order to solve this problem, the inventor has developed a home network demarcation filter 84 as shown in dotted lines in FIG. 1 for connection at a point of demarcation (NID/surge protector unit 32) between the telephone company's incoming lines 16 and the subscriber's internal house wiring 34 via the demarcation unit 36. A schematic circuit diagram of the home network demarcation network is depicted in FIG. 7. The demarcation filter 84 includes two input (tip and ring) terminals 86, 88 which are connectable to the incoming lines via the jack side of the demarcation unit 36 in the NID/surge protector unit 32 and two output (tip and ring) terminals 90, 92 which are connectable to the internal house wiring via the plug side of the demarcation unit 36. The demarcation filter is comprised of six inductors L9-L14 and two capacitors C2, C3. In use, the demarcation filter is transparent to the ADSL data signals having the frequencies between 30 KHz and 2 MHz but will produce an attenuation of more than 40 dB for frequencies above 5 MHz. The demarcation filter will also provide an inductive input impedance for above 5 MHz frequency band so as to prevent loading down the home networking signals on the incoming phone lines and also adds data security benefits.

From the foregoing detailed description, it can thus be seen that the present invention provides an impedance blocking filter circuit used in telecommunication systems for interconnecting between incoming telephone lines and customer's terminal equipment so as to unconditionally block impedances above 20 KHz due to the customer's terminal equipment from an ADSL network interface unit and/or home networking interface unit. The impedance blocking filter circuit is comprised of six inductors, two resistors, and a capacitor.

While there has been illustrated and described what is at present considered to be a preferred embodiment of the present invention, it will be understood by those skilled in the art that various changes and modifications may be made, and equivalents may be substituted for elements thereof without departing from the true scope of the invention. In addition, many modifications may be made to adapt a particular situation or material to the teachings of the invention without departing from the central scope thereof. Therefore, it is intended that this invention not be limited to the particular embodiment disclosed as the best mode contemplated for carrying out the invention, but that the invention will include all embodiments falling within the scope of the appended claims.

What is claimed is:

[1. An impedance blocking filter circuit used in telecommunication systems for interconnecting between incoming telephone lines and customer's terminal equipment so as to unconditionally block impedances from above 20 KHz due to the customer's terminal equipment from an ADSL network unit and/or home networking interface unit, said filter circuit comprising:

first, second, and third inductors connected in series between a first input terminal and a first common point;

said first inductor having its one end connected to said first input terminal and its other end connected to one end of said second inductor, said second inductor having its other end connected to one end of said third inductor, said third inductor having its other end connected to said first common point;

a first resistor having its one end also connected to said first common point and its other end connected to a first output terminal;

fourth, fifth, and sixth inductors connected in series between a second input terminal and a second common point;

said four inductor having its one end connected to said second input terminal and its other end connected to one end of said fifth inductor, said fifth inductor having its other end connected to one end of said sixth inductor, said sixth inductor having its other end connected to said second common point;

a second resistor having its one end also connected to said second common point and its other end connected to a second output terminal; and a capacitor having its one end connected to said first common point and its other end connected to said second common point.]

[2. An impedance blocking filter circuit as claimed in claim 1, wherein said first and fourth inductors are comprised of ferrite toroids.]

[3. An impedance blocking filter circuit as claimed in claim 2, wherein said second and fifth inductors have values on the order of 220 μH.]

[4. An impedance blocking filter circuit as claimed in claim 3, wherein said third and sixth inductors have values on the order of 10 mH.]

[5. An impedance blocking filter circuit as claimed in claim 4, wherein said first and second resistors have values on the order of 22 Ohms.]

[6. An impedance blocking filter circuit as claimed in claim 5, wherein said capacitor has the value on the order of 22 nf.]

[7. An impedance blocking filter circuit as claimed in claim 1, further comprising current limiting protection means connected between said common points and said output terminals for reducing current spikes caused by the customer's terminal equipment going off-hook.]

[8. An impedance blocking filter circuit as claimed in claim 7, wherein said current limiting protection means is comprised of first and second depletion mode field-effect transistors and first and second transient protection varistors.]

[9. An impedance blocking filter circuit as claimed in claim 8, wherein said first depletion mode field-effect transistor has its conduction path electrodes interconnected between said first common point and said one end of said first resistor and its gate electrode connected to said other end of said first resistor, said second depletion mode field-effect transistor having its conduction path electrodes interconnected between said second common point and said one end of said second resistor and its gate electrode connected to said other end of said second resistor, said first varistor having its one end connected also to said first common point and its other end connected to said first output terminal, said second varistor having its one end connected also to said second common point and its other end connected to said second output terminal.]

[10. An impedance blocking filter circuit used in telecommunication systems for interconnecting between incoming telephone lines and customer's terminal equipment so as to unconditionally block impedances from above 20 KHz due to the customer's terminal equipment from an ADSL network unit and/or home networking interface unit, said filter circuit comprising:

first, second, and third inductors connected in series between a first input terminal and a first common point;

said first inductor having its one end connected to said first input terminal and its other end connected to one end of said second inductor, said second inductor having its other end connected to one end of said third inductor, said third inductor having its other end connected to said first common point;

a seventh inductor and a first resistor connected in series between said first common point and a first output terminal, said seventh inductor having its one end connected also to said first common point and its other end connected to one end of said first resistor, said first resistor having its other end connected to a first output terminal;

fourth, fifth, and sixth inductors connected in series between a second input terminal and a second common point;

said four inductor having its one end connected to said second input terminal and its other end connected to one end of said fifth inductor, said fifth inductor having its other end connected to one end of said sixth inductor, said sixth inductor having its other end connected to said second common point;

an eighth inductor and a second resistor connected in series between said second common point and a second output terminal, said eighth inductor having its one end connected also to said second common point and its other end connected to one end of said second resistor, said second resistor having its other end connected to a second output terminal; and a capacitor having its one end connected to said first common point and its other end connected to said second common point.]

[11. An impedance blocking filter circuit as claimed in claim 10, wherein said first and fourth inductors are comprised of ferrite toroids.]

[12. An impedance blocking filter circuit as claimed in claim 11, wherein said second and fifth inductors have values on the order of 220 μH.]

[13. An impedance blocking filter circuit as claimed in claim 12, wherein said third and sixth inductors have values on the order of 5-10 mH.]

[14. An impedance blocking filter circuit as claimed in claim 13, wherein said seventh and eighth inductors have values on the order of 5-10 mH.]

[15. An impedance blocking filter circuit as claimed in claim 14, wherein said first and second resistors have values on the order of 22 Ohms.]

[16. An impedance blocking filter circuit as claimed in claim 15, wherein said capacitor has the value on the order of 47 nf.]

[17. An impedance blocking filter circuit as claimed in claim 1, further comprising home network demarcation filter means interconnected between the incoming telephone lines and internal house wiring for blocking the impedance of the customer's terminal equipment from home networking signals.]

[18. An impedance blocking filter circuit as claimed in claim 17, said demarcation filter means is comprised of six inductors and two capacitors.]

[19. An impedance blocking filter circuit as claimed in claim 10, further comprising home network demarcation filter means interconnected between the incoming telephone lines and internal house wiring for blocking the impedance of the customer's terminal equipment from home networking signals.]

[20. An impedance blocking filter circuit as claimed in claim 19, said demarcation filter means is comprised of six inductors and two capacitors.]

*21. A telecommunications filter, comprising:*

*at least three first inductors electrically disposed between a first input terminal of an incoming telephone line and a first common point;*

*at least three second inductors electrically disposed between a second input terminal of an incoming telephone line and a second common point;*

*at least one capacitor disposed electrically between said first and second common points; and*

*a current limiting protection circuit disposed electrically between said first and second common points and respective ones of a first output terminal and a second output terminal.*

*22. The filter of claim 21, wherein said filter comprises a high-frequency impedance blocking capability with the capability to block impedances above approximately 20 kHz.*

*23. The filter of claim 21, wherein at least one of each of said three first inductors and said three second inductors comprises a ferrite toroid.*

*24. The filter of claim 23, wherein at least one of each of said three first and second inductors has an inductance value on the order of 220 μH.*

*25. The filter of claim 24, wherein at least one of each of said three first and second inductors has an inductance value on the order of 10 mH.*

*26. The filter of claim 21, wherein said current limiting protection circuit comprises first and second resistors each have a resistance value on the order of 5-20 Ohms.*

*27. The filter of claim 26, wherein at least one of each of said three first and second inductors comprises a ferrite toroid.*

*28. The filter of claim 27, wherein at least one of each of said three first and second inductors has an inductance value on the order of 220 μH.*

*29. The filter of claim 28, wherein at least one of each of said three first and second inductors has an inductance value on the order of 5 mH.*

*30. The filter of claim 29, wherein said at least one third and fourth inductors each has an inductance value on the order of 5 mH.*

*31. The filter of claim 21, wherein said at least one capacitor has a capacitance value on the order of 22 nf.*

*32. The filter of claim 21, wherein said filter is adapted for interconnection between incoming telephone lines and a customer's terminal equipment and configured so as to unconditionally block impedances from above 20 KHz associated with the customer's terminal equipment from an ADSL network unit and/or home networking interface unit.*

*33. A telecommunications filter circuit comprising:*

*at least one first inductor electrically disposed between a first input terminal of an incoming telephone line and a first common point;*

*at least one second inductor electrically disposed between a second input terminal of an incoming telephone line and a second common point;*

*at least one capacitor disposed electrically between said first and second common points; and*

*a substantially transistorized current limiter disposed between said first and second common points and a first output terminal and a second output terminal.*

*34. The filter circuit of claim 33, wherein said current limiter is adapted to reduce current spikes caused by terminal equipment coupled to said output terminals going off-hook.*

*35. The filter circuit of claim 33, wherein said current limiter comprises first and second field-effect transistors and first and second varistors.*

*36. The filter circuit of claim 33, further comprising:*

*at least one third inductor disposed electrically between said first common point and said current limiter; and*

*at least one fourth inductor disposed electrically between said second common point and said current limiter.*

*37. An impedance blocking DSL filter circuit, comprising:*

*a plurality of first input terminals from an incoming telephone line;*

*a plurality of second output terminals;*

*a plurality of common points disposed electrically between respective ones of said first input terminals and said second output terminals;*

*a first filter stage disposed electrically between said first input terminals and said common points;*

*a second filter stage disposed electrically between said common points and said second output terminals, said second stage comprising at least one substantially transistorized current limiter; and*

*a capacitance disposed electrically between said common points.*

*38. A telecommunications filter circuit comprising:*

*at least one first inductor electrically disposed between a first input terminal and a first common point;*

*at least one second inductor electrically disposed between a second input terminal and a second common point;*

*at least one capacitor disposed electrically between said first and second common points; and*

*a substantially transistorized current limiter comprising first and second field-effect transistors and first and second varistors and first and second resistors, said first field-effect transistor having its conduction path electrodes interconnected between said first common point and a first end of said first resistor and its gate electrode connected to a second end of said first resistor, said second field-effect transistor having its conduction path electrodes interconnected between said second common point and a first end of said second resistor and its gate electrode connected to a second end of said second resistor, said first varistor having its one end connected also to said first common point and its other end connected to said first output terminal, said second varistor having its one end connected also to said second common point and its other end connected to said second output terminal.*

* * * * *